United States Patent
Bennett et al.

(10) Patent No.: US 6,583,645 B1
(45) Date of Patent: Jun. 24, 2003

(54) FIELD PROGRAMMABLE OPTICAL ARRAYS

(75) Inventors: David W. Bennett, Lafayette, CO (US); Sundararajarao Mohan, Sunnyvale, CA (US); Ralph D. Wittig, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/940,992

(22) Filed: Aug. 27, 2001

(51) Int. Cl.[7] .......................... H03K 19/177; G02B 6/26
(52) U.S. Cl. ............................. 326/41; 326/47; 370/539; 385/17; 385/24; 385/16
(58) Field of Search ..................................... 326/38–41

(56) References Cited

U.S. PATENT DOCUMENTS

| | | |
|---|---|---|
| 5,914,616 A | 6/1999 | Young et al. |
| 6,016,211 A | 1/2000 | Szymanski et al. |
| 6,259,308 B1 | 7/2001 | Torazawa |
| 6,259,831 B1 | 7/2001 | Faris et al. |
| 6,259,833 B1 | 7/2001 | Doerr et al. |
| 6,259,834 B1 | 7/2001 | Shani |
| 6,351,579 B1 * | 2/2002 | Early et al. .................... 385/18 |
| 6,351,581 B1 * | 2/2002 | Doerr et al. ................... 385/24 |
| 6,359,729 B1 * | 3/2002 | Amoruso ................. 359/341.1 |

OTHER PUBLICATIONS

U.S. patent application Ser. No. 09/775,721, Cao, filed Jan. 1, 2001.
U.S. patent application Ser. No. 09/733,357, Yariv, filed Dec. 7, 2000.
D.V. Tishinin et al., "Vertical Resonant Couplers with Precise Coupling Efficiency Control Fabricated by Wafer Bonding" IEEE Photonics Technology Letters, vol. 11, No. 8, Aug. 1999, pp. 1003–1005.
John Bowers, "Scaling in Photonic Switches" Calient Networks, Jun. 23, 2001, pp. 1–8.
C. Randy Giles and Magaly Spector, "The Wavelength Add/Drop Multiplexer for Lightwave Communication Networks", Copyright 1999, Lucent Technologies, Inc., Bell Labs Technical Journal—Jan.–Mar. 1999, pp. 207–229.

* cited by examiner

Primary Examiner—Michael Tokar
Assistant Examiner—Vibol Tan
(74) Attorney, Agent, or Firm—Edel M. Young; Scott R. Brown

(57) ABSTRACT

An FPGA is described using optical waveguides for routing signals through the FPGA. The routing is controlled electrically. Either coupling waveguides or resonant disks can be used for routing the optical signals. Lookup tables convert optical input signals to electrical signals for selecting values in the lookup table.

4 Claims, 5 Drawing Sheets

FIELD PROGRAMMABLE OPTICAL ARRAYS

FIELD OF THE INVENTION

The present invention relates to semiconductor integrated circuit devices, more particularly to forming a field programmable gate array using optical signals and optical switches rather than or in combination with electrical signals and electrical switches.

BACKGROUND

As field programmable logic devices have become larger and more complex, there has been continuing demand for faster and lower power processing of signals. Until the present, the internal signals in a field programmable integrated circuit device as well as many other integrated circuit devices have been electrical signals carried by conductive metal or polysilicon lines. Transmission speed of these electrical signals is considerably slower than the speed of light. Thus, theoretically, the transmission speed can be increased.

A good overview of the state of the art of optical networking technology and components is provided by the textbook authored by Ramaswami and Sivarajan titled "Optical Networks: a Practical Perspective" (1998).

It is known to form optical conductors within integrated circuit devices. For example, as shown in FIG. 1, a well is formed in a semiconductor substrate comprised of an opaque material, typically gallium arsenide or indium phosphide. The well is then filled with a glass ($SiO_2$) or glass-like material. A top layer of opaque material is then deposited over the glass material to form a waveguide. Wave guides typically have a width on the order of 1.8 microns.

It is also known to form optical switches within integrated circuit devices. By bringing wave guides close together, it is possible to use electrical potential to control switching between one wave guide and the other. FIGS. 2A and 2B shows such structures. In FIG. 2A, two wave guides 22, 24 of the type just described are manufactured to have coupling sections very close together so that there is a thin opaque wall 27 made of semiconductor material between the two wave guides. Typically the two wave guides will be laid out close to each other in region 26 for a length L, known as the coupling length, where the exact value of the coupling length depends on process technology. As discussed in U.S. Pat. No. 6,259,834, the strength of the coupling is characterized by a coupling coefficient k such that in a distance $j=\pi/2k$ all of the optical energy entering waveguide 22 is transferred by this coupling to waveguide 24. If the coupling length L is equal to j, then with no voltage applied between the two waveguides, all optical energy is transferred.

The coupler works as follows. Assume light is traveling from left to right within wave guides 22, 24 (light can of course travel in either direction). Because of quantum mechanical effects, light traveling in waveguide 22 can be transmitted through the thin opaque wall into waveguide 24. By applying an electric field to electrodes 42 and 44 at the junction of the two wave guides in region 26, the transmittance of light through the thin opaque wall 27 can be changed. Applying electric potential can cause anything from no transmission to full transmission to occur through the thin opaque wall 27. In this manner, an electric field can be applied which will cause some or all of the light in channel 22 to be transmitted into channel 24, where it will continue to propagate down the second waveguide. Light signals can travel simultaneously in both channels and be coupled by different amounts if other signals in the channels have different wavelengths. An opposite electric field can be applied to the thin opaque wall 27, which will cause no light to be transmitted from waveguide 22 into waveguide 24. In this case, light in waveguide 24 will simply propagate unchanged.

Since light can be divided between the two wave guides 22 and 24, the optical coupler of FIG. 2B can serve to fan out a signal from terminal 3 to terminals 1 and 2, as junctions in electrical wires are well known to do. Similarly, when light is propagated in the opposite direction, the structure of FIG. 2B can be used as a multiplexer, whereby voltages on electrodes 23 and 25 select which of the signals on terminals 1 and 2 is propagated to terminal 3.

FIG. 3 shows another coupler. In this coupler, there are two wave guides 28, 30 running parallel to each other, which are coupled by a resonant disc 32 that is bonded on top of the two wave guides. Light in one waveguide is transferred to the second waveguide through the resonant disc. Details of this light transfer and its control are described in IEEE Photonics Technology Letters, vol. 11, no. 8, August 1999, pages 1003–1005, and are not repeated here.

Micromirrors are also known for selecting optical pathways as in a multiplexer. FIG. 4 shows such a structure. The multiplexer is made from three 2:1 optical switches 42, 44, and 46, that are controlled by electrical signals to pass optical signals. The three switches 42, 44, and 46 are constructed in the same way. Optical switch 42 has two inputs 48, 50, one output 52, and a control block 54 for altering which input signal is transmitted to the output. Switch 46 has two inputs 58, 60, an output 62, and a control block 64. Switch 44 has two inputs 66, 68, an output 70, and a control block 72. Output 52 of switch 42 is connected to input 58 of switch 46, output 70 of switch 44 is connected to input 60 of switch 46, and the four inputs 48, 50, 66, 68 comprise the inputs to the 4:1 multiplexer with output 62 comprising the output of the 4:1 multiplexer. A static random access memory 56 provides control signals to the control blocks of each switch. By appropriately setting the values in SRAM 56, any of the four optical input signals can be selected to be transmitted to the output of the 4:1 multiplexer. By adding additional 2:1 switches it is possible to create an N:1 optical switch multiplexer. Thus electrical signals control optical signals.

It is also known to use optical signals within an integrated circuit device to generate electrical signals. Torazawa in U.S. Pat. No. 6,259,308 describes an optical coupling semiconductor switching circuit with a light detector that receives a signal from a light emitting device and generates a voltage across an impedance circuit. Thus an electrical signal is generated from an optical signal.

U.S. Pat. No. 6,016,211 describes an opto-electronic array that receives optical signals at its inputs, converts those signals to electronic signals for switching purposes, switches the electronic signals appropriately, and then reconverts the electronic signals back to optical signals at its output. This has the advantage of providing flexibility in signal switching contained within the relatively small space of an integrated circuit device. But there is a loss of speed in comparison to maintaining the signals as optical signals.

It would be desirable to implement an FPGA that uses optical switching in an architecture having logic blocks, programmable interconnect lines and input/output blocks, where as many data signals as possible are carried optically for maximum speed and low power.

SUMMARY

According to the invention, an FPGA-like architecture uses data paths formed almost entirely of optical switches and optical channels, and control of the switches using electrical signals. This combination makes for both high speed data transmission and highly flexible configuration.

A typical FPGA uses lookup tables to provide a function of several (for example four) input signals. In order to provide the high speed of an optical device, the input signals must be optical, the output signal must be optical, and reading of a value from a lookup table must be done quickly.

According to the invention, the lookup table accesses optical signals (in one embodiment, a lookup table includes 16 switches for accessing optical signals, and one of the switches is selected by four input signals). The four input signals are electrical signals generated by optical signals. The four input signals route one of the 16 optical signals to an output terminal where it can be routed along a wave guide or through further optical switches to a final destination. Because most of the data path is optical, speed is high, power is low, and power loss is low.

It is estimated that a large improvement in speed will be available with this optical FPGA architecture. The speed of an electrical signal in an integrated circuit wire is on the order of 5 mm/ns. The speed of light in a waveguide (about half the speed of light in a vacuum) is on the order of 150 mm/ns. Instead of all FPGA signals being electrical, only the signals that control other signals must be electrical, therefore the overall speed is much faster.

DETAILED DESCRIPTION

Figure 5:
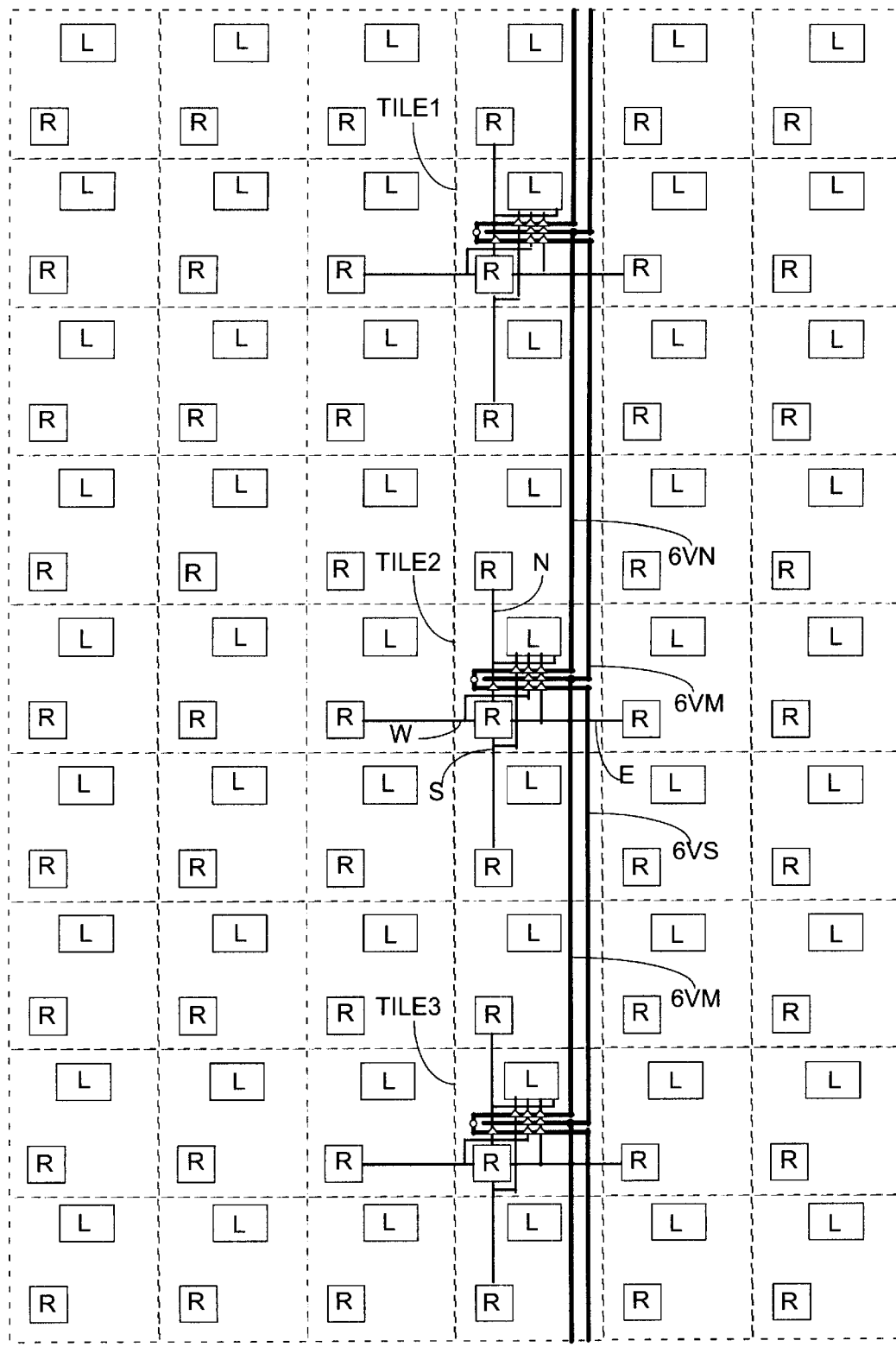
FIG. 5 shows a block diagram of an FPGA structure with which the present invention may be used.

FIG. 5 shows a block diagram of an FPGA structure with which the present invention may be used. Each tile includes a logic structure L and a routing structure R. Also included, though shown for only a few tiles, is an interconnect structure by which one tile can be connected to another tile. The interconnect structures are the same for all tiles, as further discussed by Young et al. in U.S. Pat. No. 5,914,616, incorporated herein by reference. According to the current invention, the routing structures and the interconnect lines are optical and are programmably connected together by optical switches that are electrically controlled. The logic structures L include both electrical and optical connections, and are discussed in more detail in connection with FIGS. 6 and 7.

Figure 4:
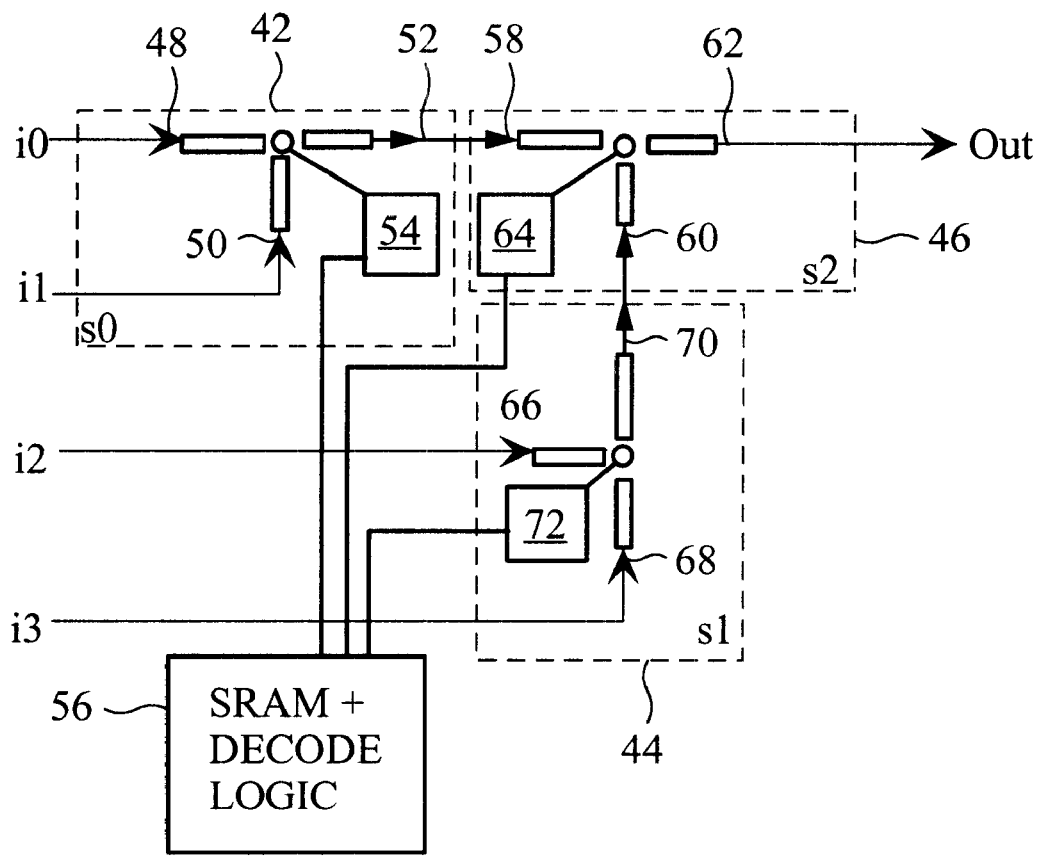
FIG. 4 represents a prior art multiplexer made from micromirror switches.
Figure 6:
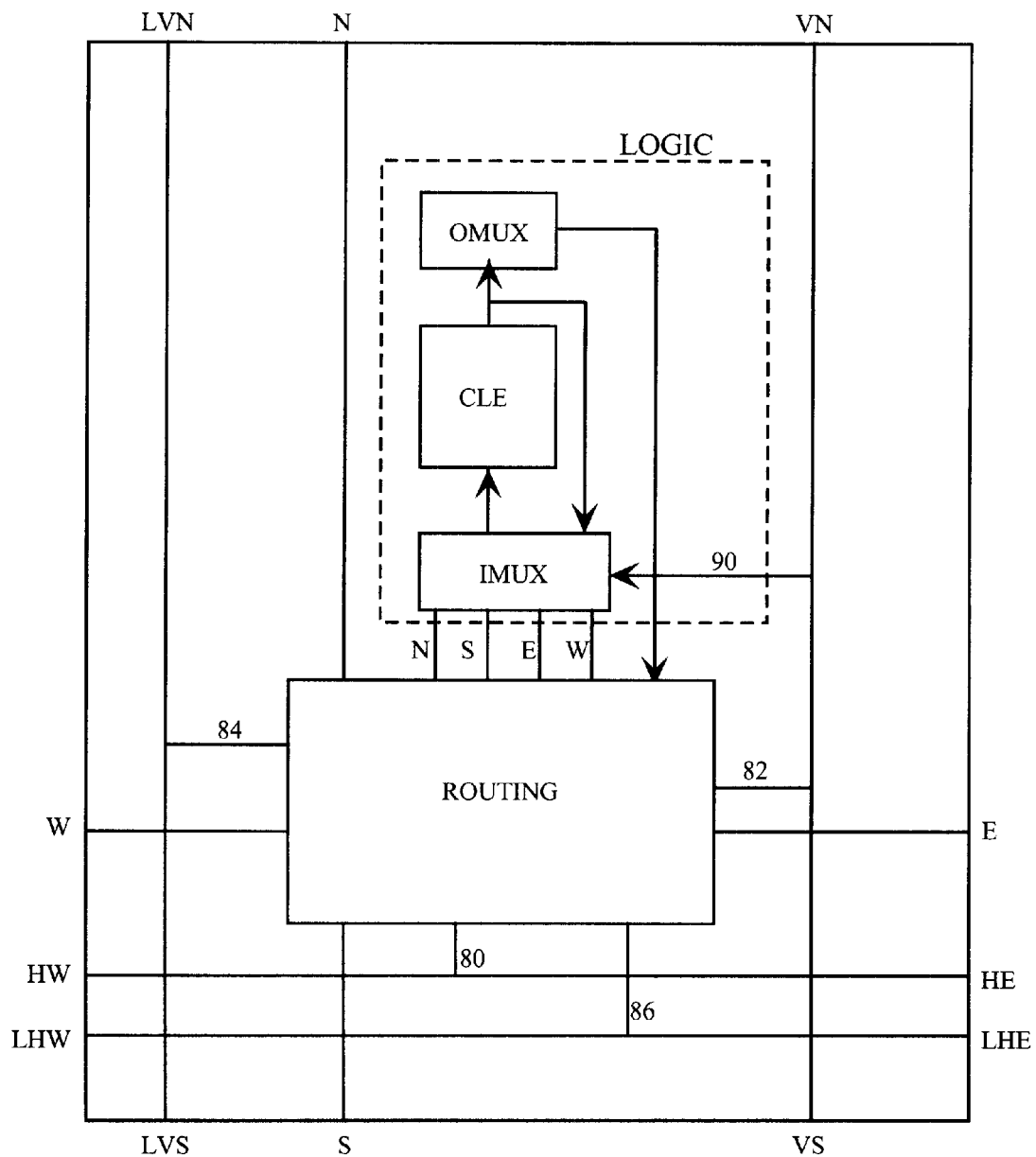
FIG. 6 shows in more detail a portion of the structure of FIG. 5.

FIG. 6 shows in more detail one of the tiles of FIG. 5. The lines shown in FIG. 6, for example lines E, HE, LHE, VS, S, and LVS are all optical, and all switching that occurs in the structure labeled ROUTING (labeled R in FIG. 5) is optical switching controlled by electrical signals, as discussed for FIG. 4 above. The section labeled LOGIC in FIG. 6 performs conversion from optical to electrical for the purpose of operating configurable logic element CLE, which includes lookup tables.

Figure 1:
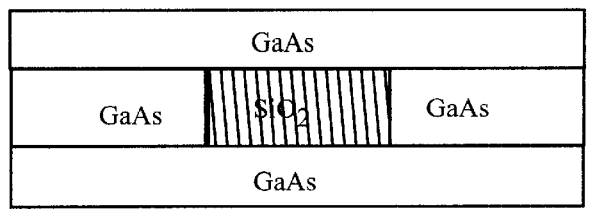
FIG. 1 shows in cross section a prior art wave guide.
Figure 2A:
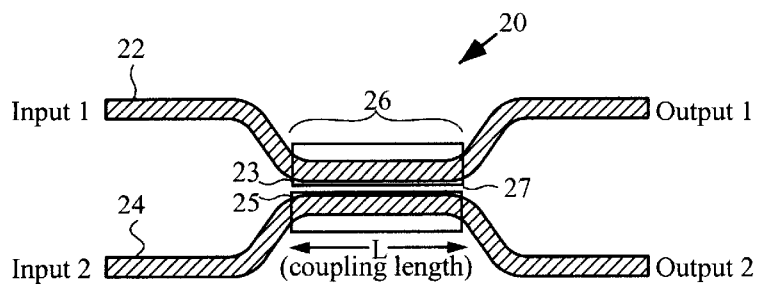
FIGS. 2A and 2B shows prior art optical couplers for transferring optical signals from one wave guide to another.
Figure 2B:
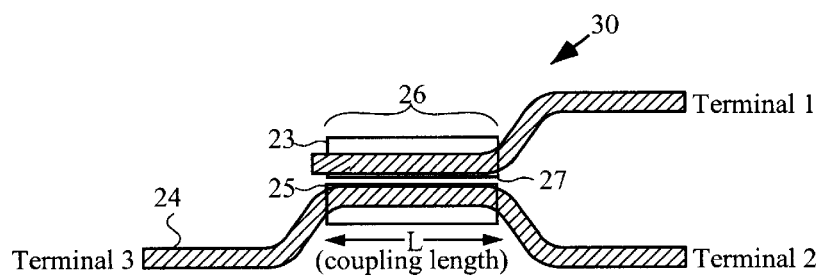
Figure 3:
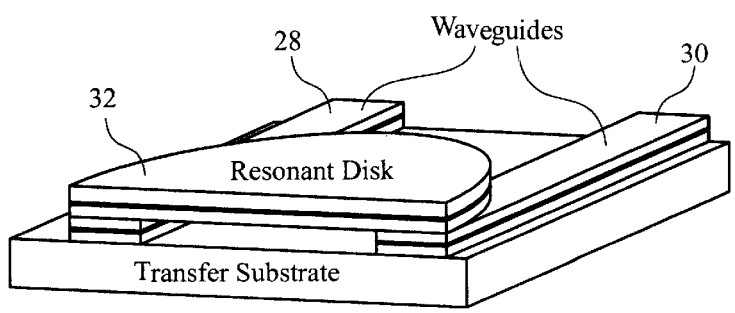
FIG. 3 shows another prior art optical coupler for transferring optical signals.
Figure 7:
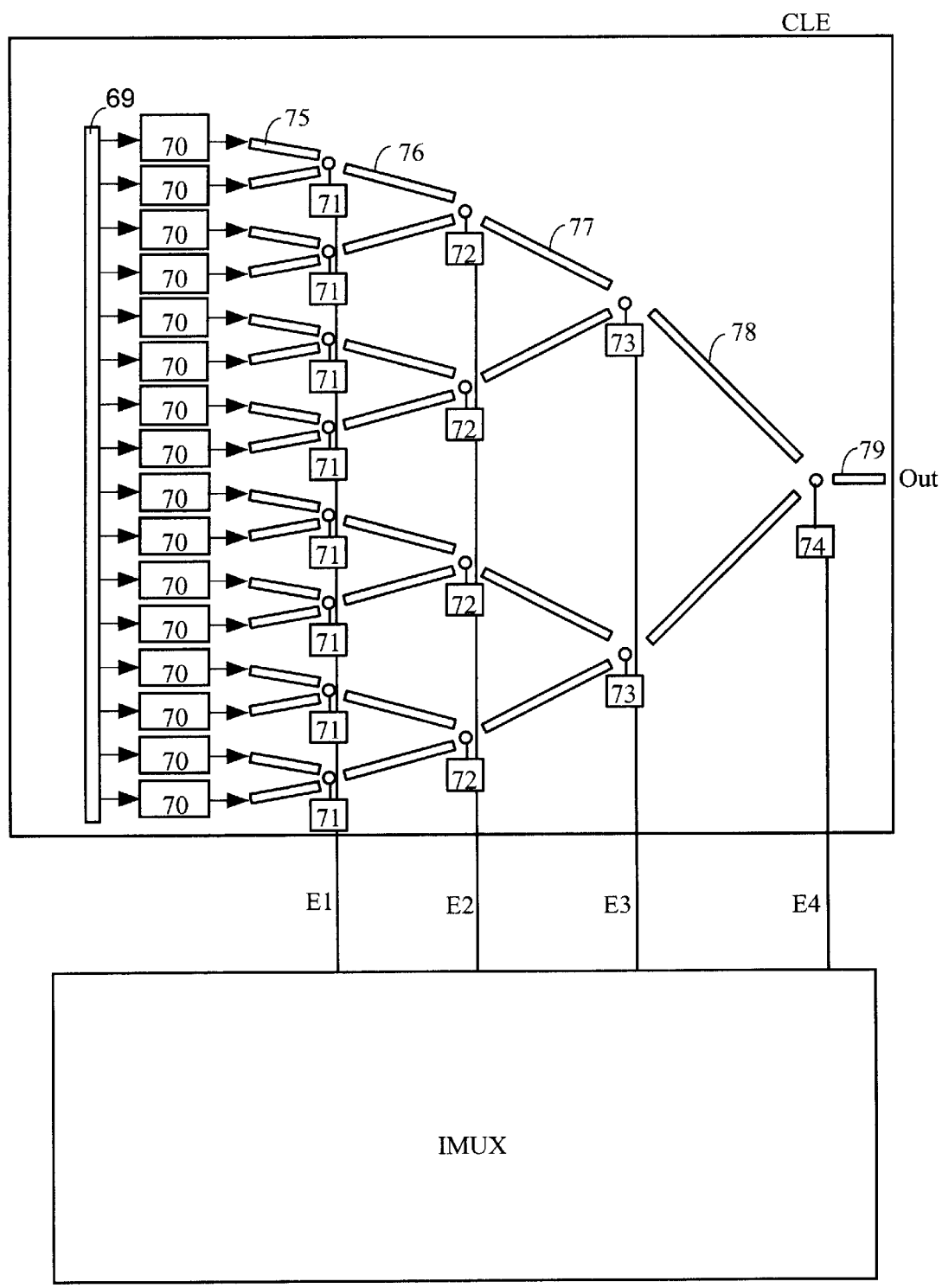
FIG. 7 shows an optical lookup table with optical switches for selecting between light and dark states, an optical output path, and electrical input signals controlling an output multiplexer.

FIG. 7 shows a lookup table usable in the CLE of FIG. 6. The lookup table of FIG. 7 includes 16 switches 70 that receive or don't receive light from wave guide 69 and either provide the light to optical wave guides 75 or provide no light to wave guide 75 depending on the state of the switch. These switches 70 are programmed to either provide or not provide light as an output signal, depending upon the function selected by a user when configuring the device. Thus switches 70 are electrically controlled to forward or not forward an optical signal present on wave guide 69. The electrical control is selected by bits in a bitstream loaded into memory cells of the FPGA when the FPGA is configured, as is the case with a conventional electrical FPGA. Electrically controlled selector 71 (which may be a micromirror or may be a coupling device similar to FIG. 2B, passes one of the signals from the two wave guides 75 to wave guide 76. Similarly, selectors 72, 73, and 74 provide one of their signals to the next stage such that one of the 16 optical signals 70 is provided to optical output wave guide 79. Electrical control of selectors 71, 72, 73, and 74 is provided by electrical conductors E1 through E4 from input multiplexer IMUX. Input multiplexer IMUX converts optical signals received from the ROUTING structure of FIG. 6 to electrical signals. This may be done using a circuit such as described by Torazawa in U.S. Pat. No. 6,259,308, or by another well known circuit. Thus the structure of FIG. 7 performs the same function as a lookup table.

What is claimed is:

1. A field programmable gate array comprising:

a plurality of configurable logic blocks;

a plurality of interconnect lines;

a plurality of switches for programmably connecting the interconnect lines to each other and to the logic blocks;

a plurality of configuration control elements for setting the switches and configuring the configurable logic blocks;

wherein the interconnect lines and switches carry and switch optical signals and the configuration control elements control the switches through electrical control means.

2. A field programmable gate array comprising:

a plurality of configurable logic blocks, each including at least one lookup table;

a plurality of interconnect lines;

a plurality of optical switches for connecting the interconnect lines to each other and to the configurable logic blocks; and wherein the configurable logic blocks each include a plurality of optical-to-electrical converters for receiving optical signals intended as input signals for the lookup table and generate electrical signals for controlling multiplexers in the lookup table to select an optical output signal.

3. A field programmable gate array (FPGA) comprising:

a plurality of configurable logic blocks, each including at least one lookup table;

a plurality of interconnect lines; and a plurality of optical switches for connecting the interconnect lines to each other and to the configurable logic blocks.

4. The FPGA of claim 3 wherein the at least one lookup table comprises:

a plurality of selectors for selecting between a light signal and no light signal, the selectors being programmable during configuration of the FPGA; and a plurality of multiplexers controlled by optical signals on interconnect lines to generate electrical signals that select between the selectors and provide a lookup table output signal.

* * * * *